(12) United States Patent
Washio

(10) Patent No.: US 6,846,239 B2
(45) Date of Patent: Jan. 25, 2005

(54) GAME PROVIDING SERVER AND GAME PROVIDING SYSTEM

(75) Inventor: Kazuto Washio, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 31 days.

(21) Appl. No.: 10/183,163

(22) Filed: Jun. 28, 2002

(65) Prior Publication Data
US 2003/0003994 A1 Jan. 2, 2003

(30) Foreign Application Priority Data
Jul. 2, 2001 (JP) .................................. 2001-200562

(51) Int. Cl.$^7$ .............................................. A63F 13/00
(52) U.S. Cl. .............................................. 463/40; 463/31
(58) Field of Search .............................. 455/3.01, 3.05, 455/73, 566; 463/1, 40–44, 30–35; 710/1

(56) References Cited

U.S. PATENT DOCUMENTS

| | | | | |
|---|---|---|---|---|
| 5,440,559 A | * | 8/1995 | Gaskill | 370/314 |
| 5,870,683 A | * | 2/1999 | Wells et al. | 455/566 |
| 5,971,855 A | * | 10/1999 | Ng | 463/42 |
| 5,999,808 A | * | 12/1999 | LaDue | 455/412.2 |
| 6,117,013 A | * | 9/2000 | Eiba | 463/41 |
| 6,370,597 B1 | * | 4/2002 | Eady et al. | 710/15 |
| 6,524,189 B1 | * | 2/2003 | Rautila | 463/40 |

* cited by examiner

Primary Examiner—Michael O'Neill
(74) Attorney, Agent, or Firm—Sughrue Mion, PLLC

(57) ABSTRACT

The game providing server and game providing system allow a user to enjoy games using a desired image on his/her portable terminal. There are provided a recording device which records game programs and other information, a transmitting/receiving device which transmits information about types of game programs to a personal computer and receives information specifying a type of game program and an image used for the game from the personal computer, an image processing device (information processing device) which resizes the received image as required, and a transmitting/receiving device which transmits the specified game program and the converted image to a portable telephone.

10 Claims, 7 Drawing Sheets

GAME PROVIDING SERVER AND GAME PROVIDING SYSTEM

BACKGROUND OF THE INVENTION

1. Field of the Invention

The present invention relates to a game providing server and game providing system, particularly to a game providing server and game providing system capable of supplying a portable terminal carried by a user with an image-containing game which can be run on the portable terminal.

2. Description of the Related Art

Games which can be run on portable telephones have been available for some time, allowing users to download and enjoy a desired game program on a portable telephone by establishing a communications connection with a game providing server which distributes game programs.

However, conventional games use images designated for specific game programs, making it impossible for the user to select an image for a game freely.

SUMMARY OF THE INVENTION

The present invention has been developed in view of the above-described circumstances. Its object is to provide a game providing server and game providing system which allow the user to enjoy games using a desired image on his/her portable terminal.

In order to attain the above-described object, the present invention is directed to a game providing server which receives an image used for a game run on a portable terminal of a user from a communications terminal of the user and sends the image and a game program that uses the image to the portable terminal, the game providing server comprising: a recording device which records game programs run on the user's portable terminal and information about types of the game programs by associating them with each other; a first transmitting device which reads the information about the types of game program run on the user's portable terminal out of the recording device and transmits the read information to the user's communications terminal; a receiving device which receives information specifying a type of game program to be run on the user's portable terminal and an image to be used for the game from the user's communications terminal; an image processing device which converts the received image to be used for the game into a display image compatible with display capacity or display specifications of a display device installed on the user's portable terminal; and a second transmitting device which reads the specified game program from the recording device and transmits the read game program to the user's portable terminal together with the display image.

Since the present invention comprises a recording device which records game programs and information about types of the game programs by associating them with each other; a first transmitting device which reads the information about the types of game program out of the above-described recording device and transmits it to the user's communications terminal; a first receiving device which receives information specifying a type of game program to be run on the user's portable terminal and an image to be used for the game from the user's communications terminal as required; an image processing device which converts the above-described received image to be used for the game into a display image compatible with display capacity or display specifications of a display device installed on the user's portable terminal as required; and a second transmitting device which reads the specified game program from the above-described recording device and transmits it to the user's portable terminal together with the above-described display image, it allows the user to enjoy a game using a desired image on the user's portable terminal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a game providing server and game providing system according to the present invention will be described in detail below with reference to the accompanying drawings.

Figure 1:
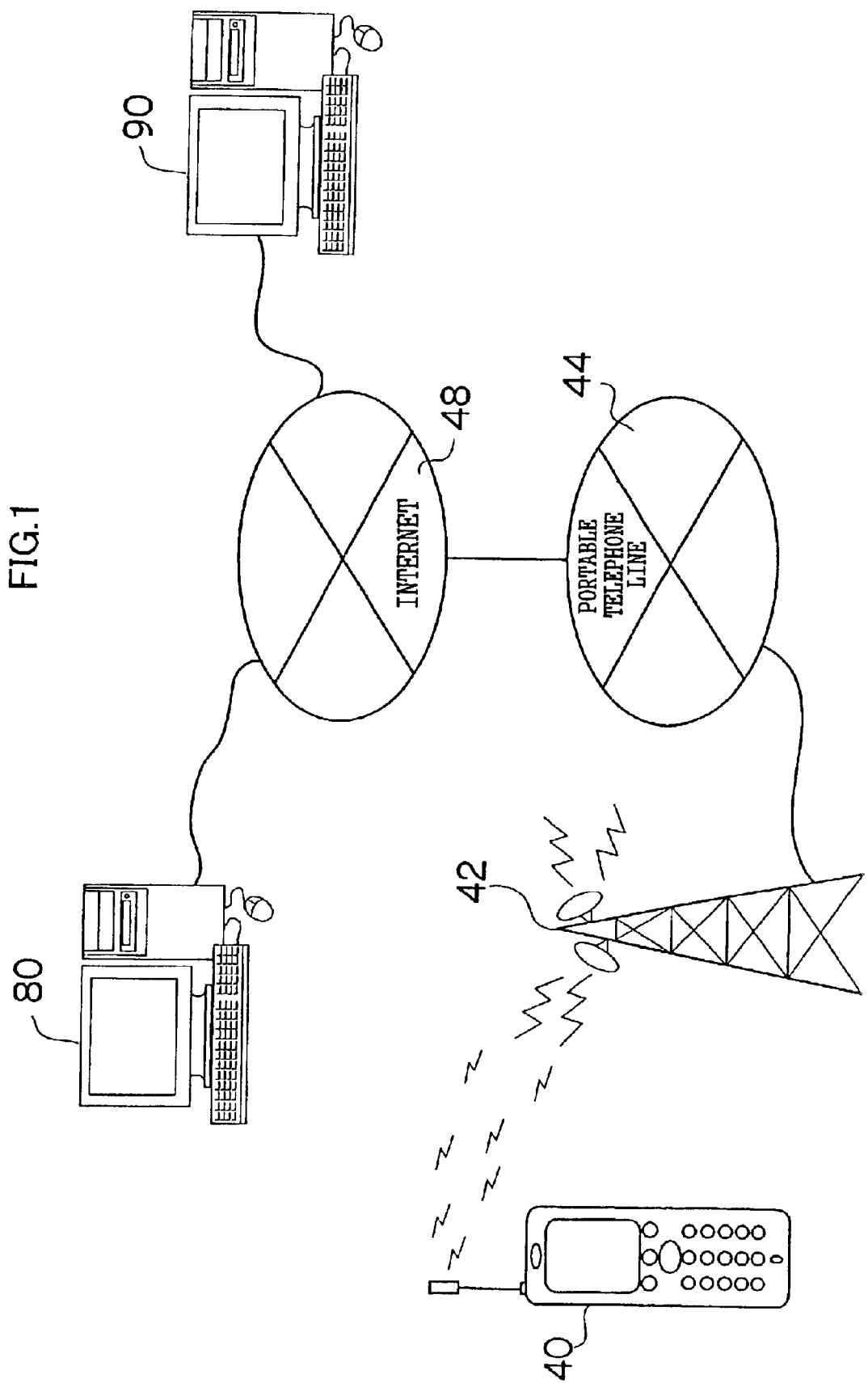
FIG. 1 is a diagram showing a game providing system according to the present invention.

FIG. 1 shows a game providing system according to an embodiment of the present invention.

As shown in the drawing, the game providing system comprises a portable telephone 40 (user's portable terminal) capable of being carried by a user, transmitting and receiving voices, and running a game program and displaying game content; a wireless base station 42 and a portable telephone line 44 used by the portable telephone 40 to transmit and receive voices, game programs and images, and other information; a user's personal computer 80 (user's communications terminal) which is used to specify a game program run on the portable telephone 40 and transmit an image used for the game via a communications network 48 such as the Internet; and a server 90 (game providing server) which transmits the game program specified and image received from the personal computer 80 to the portable telephone 40 via the communications network 48 and the portable telephone line 44.

The portable telephone 40 can receive the image used for the game and the game program from the server 90. Then, it can run the received game program and display game content using the received image.

Incidentally, it should be understood that the portable terminal is not limited to the portable telephone described above, but any portable terminal such as a personal computer or PDA (personal data assistance), or the like can serve the purpose of the present invention as long as it can be carried by the user and is provided with means for communication capable of transmitting and receiving information to/from communications networks such as the Internet.

Also, the user's communications terminal is not limited to the personal computer 80 described above, but a communications terminal such as a portable telephone 40 or PDA can also serve the purpose of the present invention.

Figure 2:
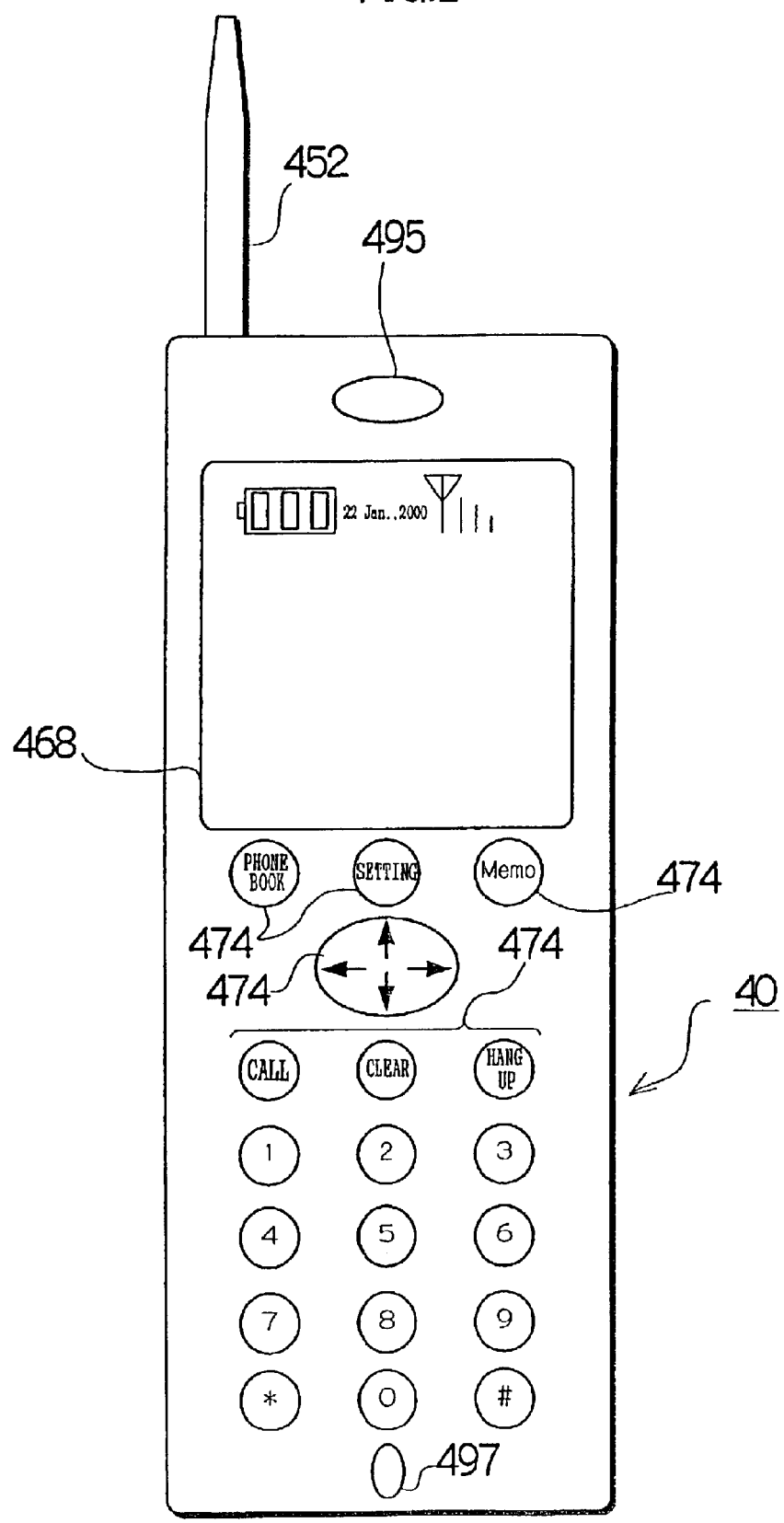
FIG. 2 is an external view of a portable telephone.

FIG. 2 is an external view of the portable telephone 40.

As shown in the drawing, the portable telephone 40 comprises an antenna 452 for wireless communications with the portable telephone line 44; a display device 468 which displays various information including communication information, schedules, and content of a running game; input devices 474, 474 . . . which enters personal information such as telephone numbers, characters, and schedules or the like, selects a type of game program to be run, gives an instruction to start a game, and so on; a speaker 495 which serves as a telephone receiver and outputs voices; and a microphone 497 for voice input.

Figure 3:
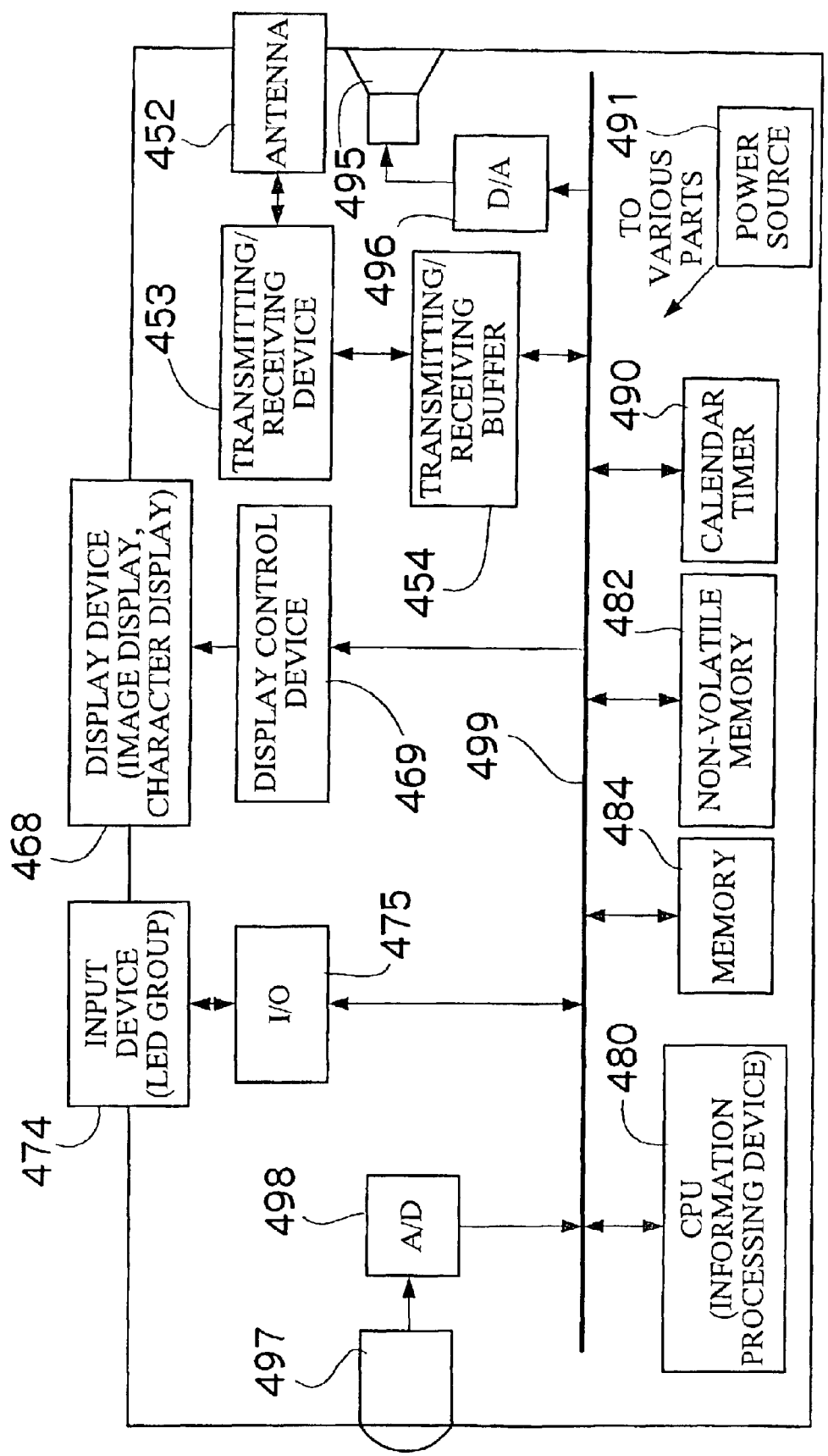
FIG. 3 is a block diagram of a signal processing system of the portable telephone.

FIG. 3 is a block diagram of a signal processing system of the portable telephone 40.

In the drawing, an information transmitting/receiving section of the portable telephone 40 comprises an antenna 452 for wireless communications with the portable telephone line 44; a transmitting/receiving device 453 (including functions of a third receiving device) for the portable telephone line 44; and a transmit/receive buffer 454 which temporarily stores information to be transmitted and received in real time.

Besides, the portable telephone 40 comprises a display device 468 (including functions of a second display device) which displays images and game content or characters and other information; a display control device 469 which outputs image signals for display to the display device 468 under instructions from an image processing device; and an I/O unit 475 which reads various information entered by the user through an input device 474 and transmits it to an information processing device described later or outputs display commands to indicating devices such as LEDs under instructions from the information processing device.

Also, the portable telephone 40 comprises an information processing device (CPU) 480 which controls the entire portable telephone 40 and runs game programs; a rewritable, non-volatile memory 482 which stores various constants for processing carried out by the portable telephone 40 as well as connection information including dial-up numbers for communications connections to communications equipment over a network, property information, URLs (Uniform Resource Locators), IP (Internet Protocol) addresses, gateway information, and DNS (Domain Name System) information; a memory 484 comprising a ROM which stores programs and various constants for operating the information processing device 480 and a RAM which is a recording medium which serves as a working area when the information processing device 480 performs processing; a calendar timer 490 which keeps time; and a power source 491 which supplies power to various circuits including the information processing device 480.

Also, the portable telephone 40 comprises a speaker 495 which serves as a telephone receiver and outputs voices when used by the user as a telephone; a D/A converter 496 which converts voice data outputted by the information processing device 480 or the like into analog voice signals and outputs them to the speaker 495 after amplification; a microphone 497 which converts inputted voices into voice signals; and an A/D converter 498 which amplifies the voice signals from the microphone 497 and converts them into voice data to be sent out to the information processing device 480 or the like.

The information processing device 480 in the portable telephone 40 is connected with peripheral circuits including the transmit/receive buffer 454, display control device 469, I/O unit 475, non-volatile memory 482, memory 484, calendar timer 490, D/A converter 496, and A/D converter 498 via a bus 499, so that it can control the peripheral circuits and transmit and receive information at high speed.

The transmitting/receiving device 453 described above is capable of receiving a specified type of game program and an image used for the game from the server 90. The information processing device 480 can run the game program using the received image and can output instructions to display game content using the above-described received image on the display device 468.

Incidentally, limits are placed on the size of game programs and other application programs or images stored in the non-volatile memory 482 in some cases to keep the portable telephone 40 compact. In such a case, for example, only approximately twenty 10-kB application programs and 5 kB of data (game scores, images, etc.) are allowed to be recorded. Any attempt to send more application programs to the portable telephone 40 is set to be rejected.

If a game program or the like which operate on the portable telephone 40 are Java-based, the non-volatile memory 482 comprises, for example, a JAR storage area for storing a file block jar for the main body of a Knock Over Blocks game program, a JAM (Java Application Manager) area for storing an attribute file block.jam which contains the attributes of the Knock Over Blocks game program, and a data storage area for storing an image file block.gif.

Also, in order to run Java programs on the portable telephone 40, various libraries including extension libraries for text conversion, data storage areas, networking, user interfacing, the portable telephone 40, etc. are stored in the non-volatile memory 482 or the memory 484. These libraries are used on native application interfaces.

Figure 4:
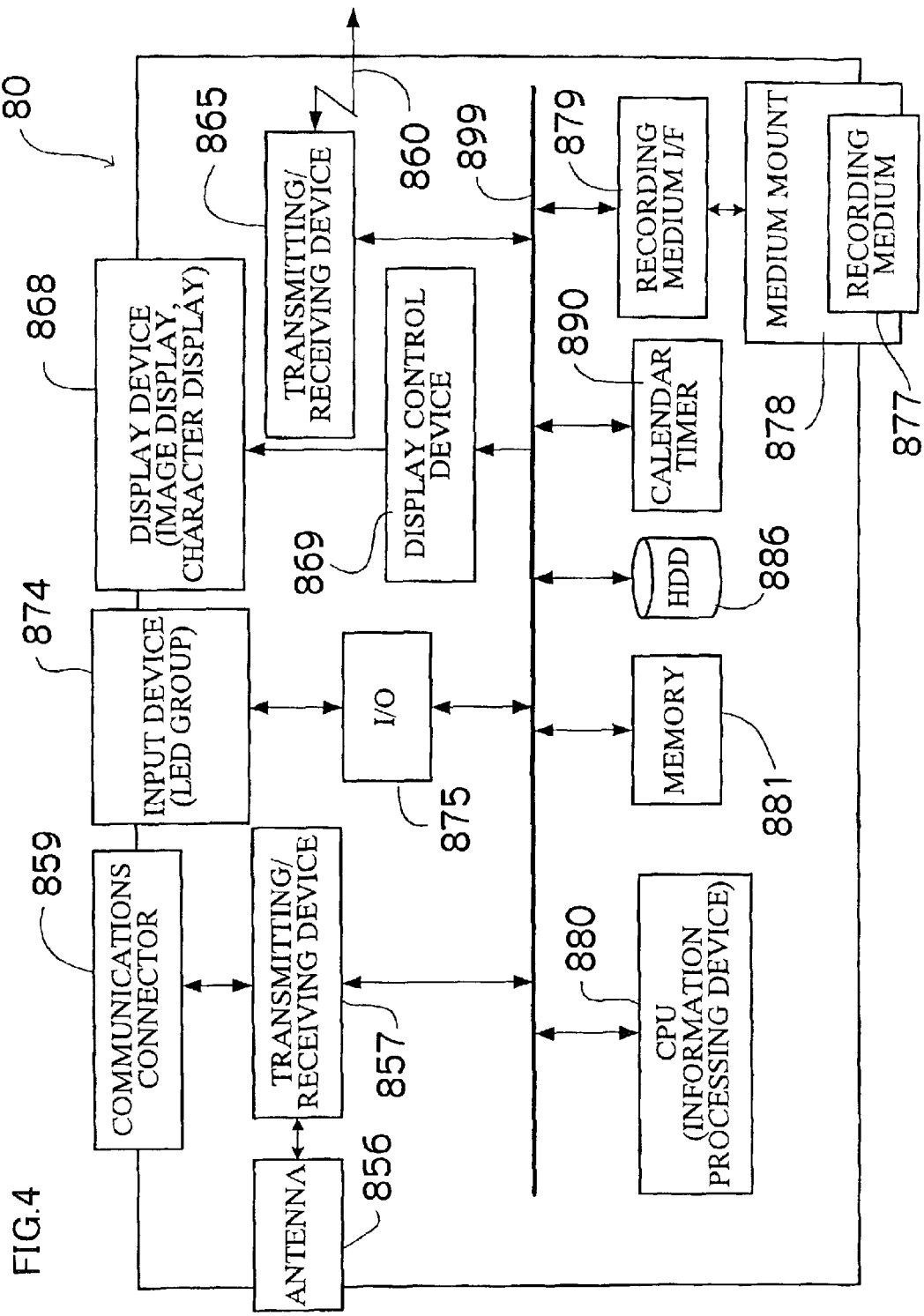
FIG. 4 is a block diagram of a signal processing system of a personal computer.

FIG. 4 is a block diagram of a signal processing system of the personal computer 80.

In the drawing, an information transmitting/receiving section of the personal computer 80 (user's communications terminal) comprises a transmitting/receiving device 865 (including a third transmitting device and second receiving device) for public circuits to transmit and receive information to/from other communications equipment (the server 90, etc.) via a public circuit 860 connected to the communications network 48.

Besides, the personal computer 80 comprises a display device 868 (including functions of a first display device) which displays information such as images and characters; a display control device 869 which outputs image signals for display to the display device 868 under instructions from an image processing device; and an I/O unit 875 which reads various information entered by the user through an input device 874 and transmits it to an information processing device described later or outputs display commands to indicating devices such as LEDs under instructions from the information processing device.

Also, the personal computer 80 comprises a medium mount 878 in which a recording medium 877 is mounted removably, and a recording medium interface 879 for recording and reading image data and other information to/from the recording medium 877. Incidentally, the recording medium 877 is a removable recording medium, which may be a semiconductor such as a memory card, magnetic recording medium and optical recording medium, such as an MO or the like.

Also, the personal computer 80 comprises an information processing device (CPU) 880 which controls the entire personal computer 80; a memory 881 comprising a ROM which stores programs and various constants for operating the information processing device 880 and a RAM which is a recording medium which serves as a working area when the information processing device 880 performs processing; a recording device 886 such as a hard disk which stores various constants for processing carried out by the personal computer 80, connection information including dial-up numbers for communications connections to communications equipment over a network, property information, URLs (Uniform Resource Locators), IP (Internet Protocol) addresses, site addresses, gateway information, and DNS (Domain Name System) information, and information such as images for games prepared by the user; and a calendar timer 890 which keeps time.

The information processing device 880 in the personal computer 80 is connected with peripheral circuits including the display control device 869, I/O unit 875, memory 881, recording device 886, and calendar timer 890 via a bus 899, so that it can control the peripheral circuits.

The transmitting/receiving device 865 described above is capable of receiving information about types of game program run on the user's portable telephone 40 from the server 90. The display device 868 is capable of displaying information about the types of game program received from the server 90 as well as reading images used for the game from the above-described recording device 886 and displaying them.

The user can specify a type of game program and an image to be used for the game via the input device 874 from among those listed on the display device 868. Information about the type of game program specified by the user and the image used for the game can be transmitted to the server 90 via the transmitting/receiving device 865.

Figure 5:
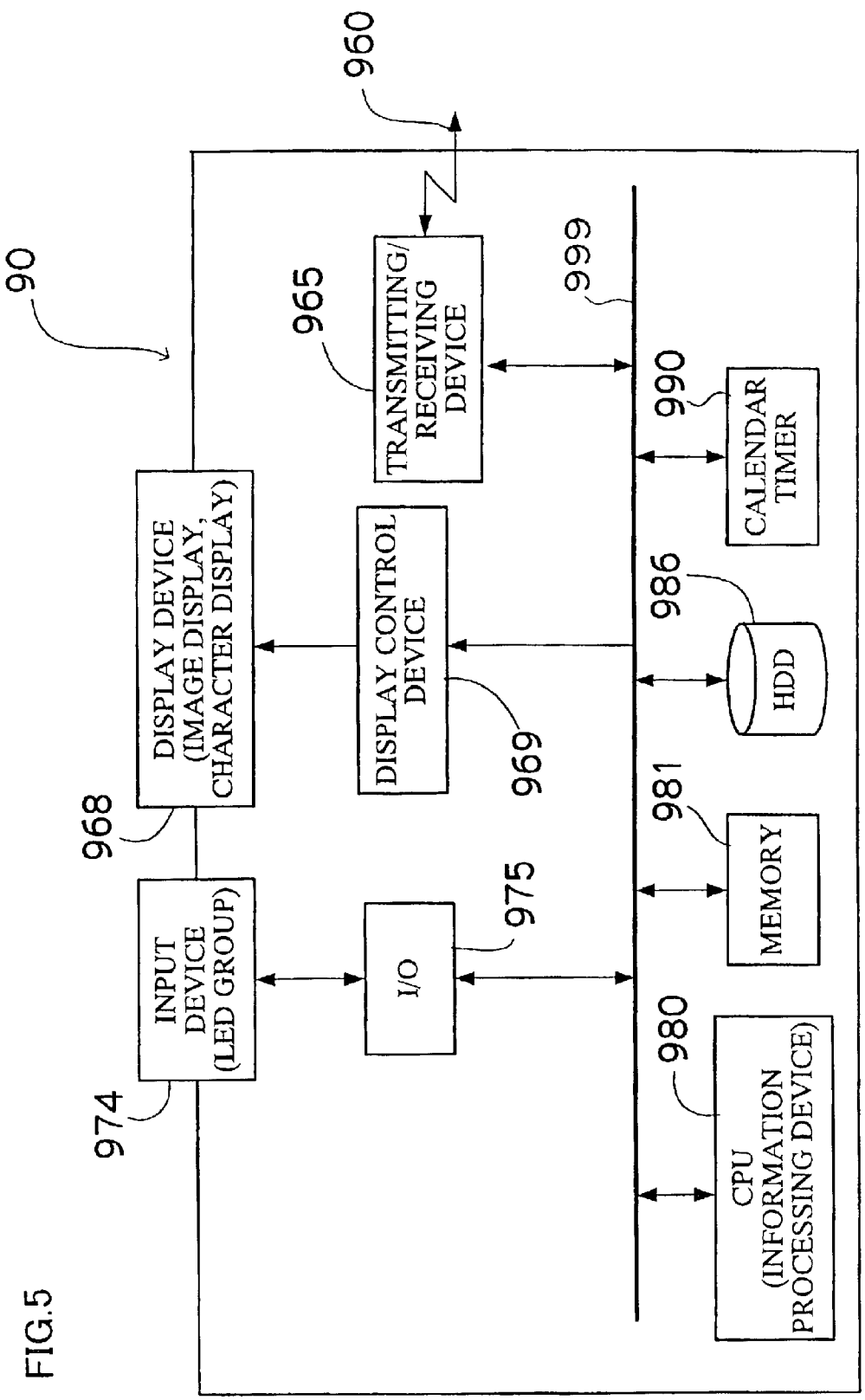
FIG. 5 is a block diagram of a signal processing system of a server.

FIG. 5 is a block diagram of a signal processing system of the server 90.

In the drawing, an information transmitting/receiving section of the server 90 comprises a transmitting/receiving device 965 (including a first transmitting device, second transmitting device, and first receiving device) for public circuits to transmit and receive information to/from other communications equipment (the personal computer 80, portable telephone 40, etc.) via a public circuit 960 connected to the communications network 48.

Besides, the server 90 comprises a display device 968 which displays information such as images and characters for verification, as required; a display control device 969 which outputs image signals for display to the display device 968 under instructions from an image processing device; and an I/O unit 975 which reads various information entered by an administrator through an input device 974 and transmits it to an information processing device described later or outputs display commands to indicating devices such as LEDs under instructions from the information processing device.

Also, the server 90 comprises an information processing device (CPU) 980 (image processing device) which controls the entire server 90; a memory 981 comprising a ROM which stores programs and various constants for operating the information processing device 980 and a RAM which is a recording medium which serves as a working area when the information processing device 980 performs processing; a recording device 986 such as a hard disk which stores various constants for processing carried out by the server 90, connection information including the server's own property information on the network, URLs (Uniform Resource Locators), addresses, site addresses, gateway information, and DNS (Domain Name System) information, etc.; and a calendar timer 990 which keeps time.

The information processing device 980 in the server 90 is connected with peripheral circuits including the display control device 969, I/O unit 975, memory 981, recording device 986, and calendar timer 990 via a bus 999, so that it can control the peripheral circuits.

The recording device 986 described above can record game programs run on the portable telephone 40 and information about their types by associating them with each other. If, for example, a game program or the like which operate on the portable telephone 40 are Java-based, the recording device 986 records the following at designated URLs: a display file block.html for downloading the Knock Over Blocks game; the file block.jar for the main body of the Knock Over Blocks game program; the application attribute file block.jam which contains the name and file name (block.jar) of the Knock Over Blocks game program, application size, URL of the package, development date, URLs of image files, arguments, etc; and the image file block.gif transmitted by the user via the personal computer 80 and used for the game.

The transmitting/receiving device 965 described above can read information about types of game program run on the portable telephone 40 from the recording device 986 described above and transmit it to the user's personal computer 80. Also, it can receive information specifying the type of game program to be run on the portable telephone 40 as well as the image to be used for the game from the user's personal computer 80.

Furthermore, the above-described transmitting/receiving device 965 can read the specified game program from the recording device 986 and transmit it along with the above-described received image to be used for the game to the portable telephone 40.

The above-described information processing device 980 is provided with image processing capabilities for converting the image received from the personal computer 80 and used for the game into a display image compatible with the display capacity or display specifications of the display device installed on the user's portable terminal 80. For example, if an image received from the personal computer 80 is provided as a 1280×960-pixel JPEG file with an 8-bit gradation each for red, green, and blue and if the display device 468 of the portable telephone 40 supports 160×120 pixels and 256 gradations of color, the image is automatically converted optimally into a display image in 160×120-pixel GIF format with 256 gradations of color.

The above-described transmitting/receiving device 965 can read the game program specified on the personal computer 80 from the recording device 986 and transmit it to the user's portable telephone 40 as well as transmit the display image to the user's portable terminal.

Figure 6:
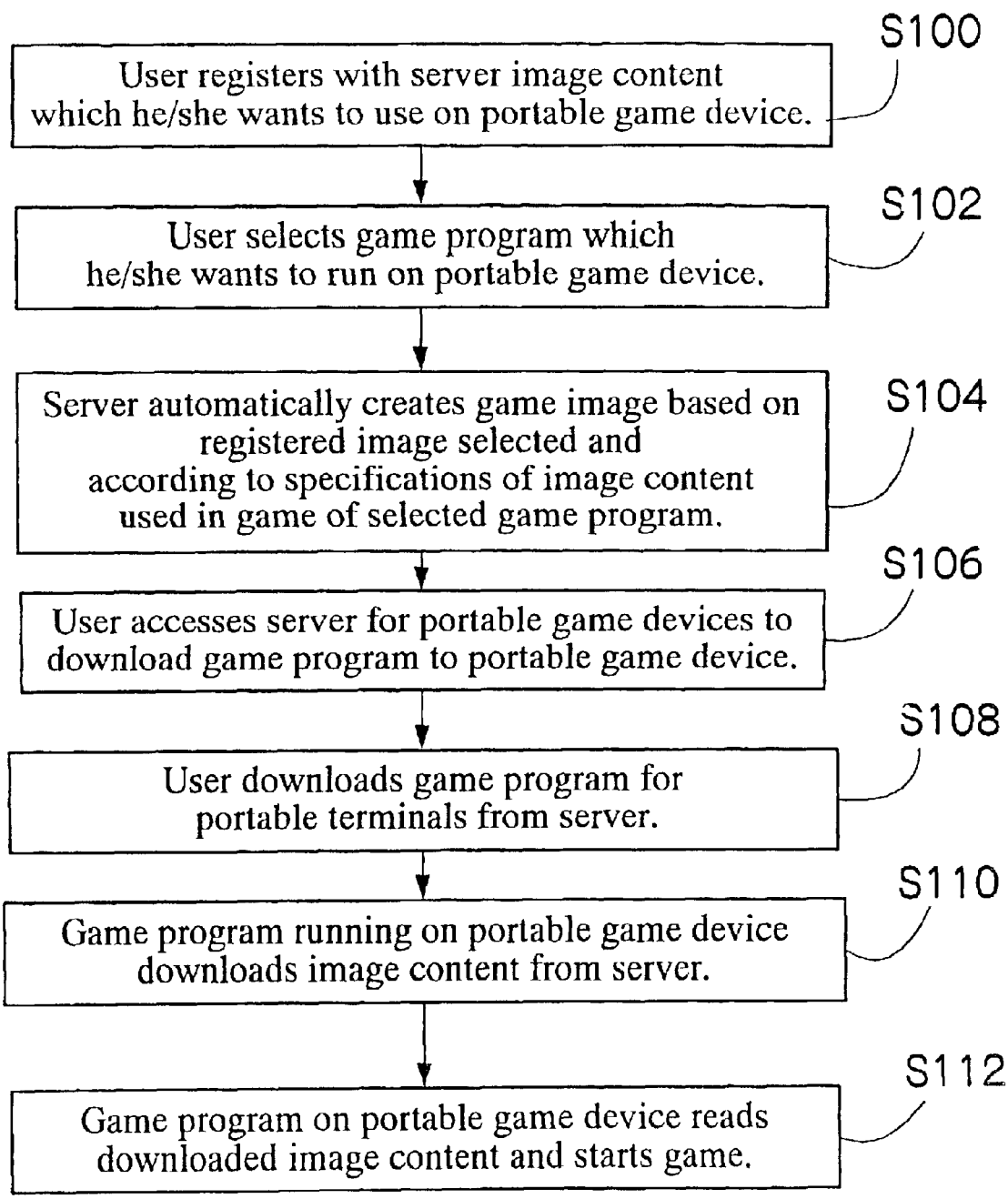
FIG. 6 is a flowchart of a game providing method using the game providing system according to the present invention.

FIG. 6 is a flowchart of a game providing method using the game providing system according to the embodiment of the present invention.

As shown in the drawing, to run a game using images specified by the user himself/herself on the portable telephone 40, the user registers with the server 90 the image content which he/she wants to use on a portable game device in Step S100 (hereinafter abbreviated to S100, for example).

In S100, the user first establishes a communications connection with the server 90 via a communications network 48 such as the Internet by operating the personal computer 80. The recording device 986 of the server 90 stores game programs run on the user's portable telephone 40 and information about the types of game program by associating them with each other. When the server 90 receives a request for information about the types of game program from the user's personal computer 80 via the transmitting/receiving device 965, the information processing device 980 of the server 90 reads information about the types of game program run on the user's portable terminal from the recording device 986 and transmits it to the user's personal computer 80 via the transmitting/receiving device 965.

The recording device 886 of the user's personal computer 80 stores, for example, images photographed by the user with a digital camera or images created by the user himself/ herself. The display device 868 displays the above-described stored images using an image viewer. By operating the input device 874, the user selects an image he/she wants to use for the game and specifies it to be transmitted. Then, the selected image is transmitted to the server 90 via the transmitting/receiving device 865. The image to be used for the game is received by the transmitting/receiving device 965 of the server 90 and recorded in the recording device 986 under a file name such as block.jpg.

If the image received from the personal computer 80 and to be used for the game is compatible with the display capacity or display specifications of the display device 468 of the portable telephone 40, the information processing device 980 stores it as it is in a designated area of the recording device 986 which can be called by using a URL such as http://abc/i/block.gif.

On the other hand, if the image received from the personal computer 80 and to be used for the game is not compatible with the display capacity or display specifications of the user's display device 468 of the portable telephone 40, the information processing device 980 (image processing device) converts it to a format compatible with the display capacity or display specifications of the user's portable telephone 40, newly creates a display image such as block.gif, and records it in a designated area of the recording device 986 which can be called using a URL such as http://abc/i/block.gif.

In S102 shown in FIG. 6, the information about the types of game program received from the server 90 is displayed on the display device 868. When the user views the game program information and selects a desired game program via the input device 874, information to that effect is transmitted from the transmitting/receiving device 865 of the personal computer 80 to the server 90.

In S102, the user may alternatively enter the e-mail address of the user's portable telephone 40 and transmit it to the server 90 together with the information about the selected game program, by operating the input device 874 of the personal computer 80. After receiving the e-mail address of the user's portable telephone 40 and other information, the server 90 sends the user's portable telephone 40 e-mail which contains URLs or the like for downloading the game program. By specifying a URL displayed on the display device 468 of the portable telephone 40, the user can download the game program easily from the specified URL to the portable telephone 40.

Next, in S104, when the transmitting/receiving device 965 of the server 90 receives the information specifying the type of game program which will be run on the user's portable telephone 40, a processing program executed by the information processing device 980 of the server 90 automatically creates a game image (by performing resize operations, etc.) based on the registered image selected and according to specifications of the image content used in the game of the selected game program. At this time, the information processing device 980 may convert the images for the game received from the personal computer 80 to a format compatible with the display capacity or display specifications of the portable telephone 40.

Furthermore, when the portable telephone 40 downloads the game program specified by the user, the information processing device 980 of the server 90 may automatically generate the display file block.html to notify the user by displaying the type of the game program and information about the download on the display device 468.

Also, when the portable telephone 40 downloads the game program specified by the user, the information processing device 980 of the server 90 may automatically generate the application attribute file block.jam for use in automatically downloading the game program and the image to be used for the game program.

Next, in S106, by operating the input device 474 of the portable telephone 40, the user enters an instruction to access the server (game providing server 90) for portable game devices in order to download the game program to the portable game device (portable telephone 40). Then, the transmitting/receiving device 453 of the portable telephone 40 establishes a communications connection with the server 90 via the portable telephone line 44 and communications network 48. When a connection is established between the portable telephone 40 and server 90, the processing goes to S108.

Next, in S108, by operating the input device 474 of the portable telephone 40, the user enters an instruction to download the game program for portable terminals from the server 90. Alternatively, the user may start downloading the game program by specifying a URL contained in the e-mail received from the server 90, or select the type of game program contained in the above-described display file block.html from a menu list on the display device 468 of the portable telephone 40 and then select and download a desired game program. At this time, the application attribute file block.jam is first received, for example, from the URL (http://abc/i/) of the server 90 via the transmitting/receiving device 453 and stored in the JAM storage area of the non-volatile memory 482.

Next, based on the package's URL contained in the above-described application attribute file received, the game program block.jar is downloaded. Then, the block.jar game program received via the transmitting/receiving device 453 is stored in the JAR storage area of the non-volatile memory 482.

Next, in S110, the user enters an instruction to run the received game program in the input device 474. If two or more game programs are stored in the non-volatile memory 482 of the portable telephone 40, the user selects the type of the desired game program from the information about the types of the multiple game programs displayed on the display device 468, by entering an instruction.

The information processing device 480 of the portable telephone 40 reads the game program specified by the above-described user from the non-volatile memory 482 and starts running the specified game program. The game program contains a description of a process of checking whether the designated image used for the game is stored in the non-volatile memory 482. If it is judged that the designated image used for the game is stored in the non-volatile memory 482, the information processing device 480 reads the stored image (block.gif) and uses it for the game in S112.

If it is judged that the designated image used for the game is not stored in the non-volatile memory 482 (because the game has never been run or the designated image used automatically for the game was erased when another game or the like was run, for example), the information processing device 480 starts downloading, from the server 90, the image file block.gif found at a URL (e.g., http://abc/i/block.gif) listed in the application attribute file (block.jam). The downloaded image is stored in a designated area (data storage area or the like) of the non-volatile memory 482. Next, in S112, the information processing device 480 reads the image file block.gif from the non-volatile memory 482 and uses it for the game.

In S112, the information processing device 480 reads the image content downloaded as described above and starts the game. Incidentally, the game program and the image used for the game may be delivered as separate files to the portable telephone 40 as described above or may be stored in the same file.

Figure 7:
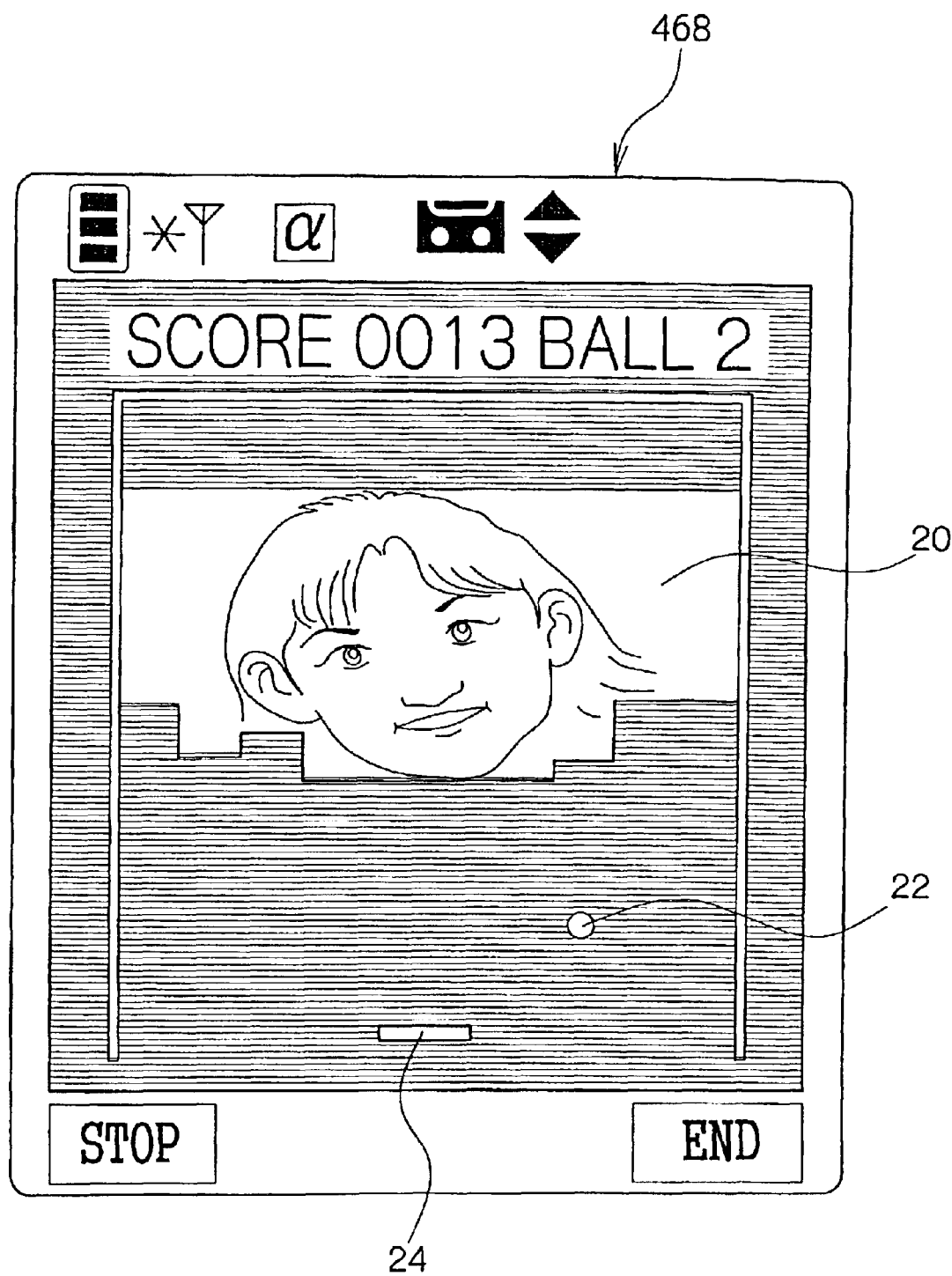
FIG. 7 is a display example of a Knock Over Blocks game using a game image transmitted by a user.

FIG. 7 is a display example of a Knock Over Blocks game using the game image transmitted by the user.

As shown in the drawing, the display device 468 of the portable telephone 40 displays the image 20 specified by the user and used for the Knock Over Blocks game, a ball 22 which moves around automatically to knock over blocks, and a racket 24 which bounces the ball 22 to the image 20, moving freely from side to side as the user operates the input device 474.

The user erases the image 20 gradually as follows: he/she moves the racket 24 from side to side by operating the input device 474 to bounce back the ball 22 in such a way that it will not fall to the bottom of the figure. The image 20 has been divided, for example, into 100 blocks. The blocks hit by the ball 22 are erased. The user gets a score according to the number of erased blocks.

The game ends when the entire image is erased, when the ball 22 drops to the bottom of the figure a preset number of times, or when the user calls an "end" to the game.

Incidentally, the present invention is not limited to the Knock Over Blocks game described above. Possible games include the one in which the user specifies a pair of cards via the input device 474 from among a plurality of cards arranged on the display device 468 as with the game of concentration and when the numbers on the pair of cards match, the corresponding parts (a pair of blocks) of the image 20 are displayed. Besides, when the user is playing a concentration game with the portable telephone 40, the pairs of blocks matched by the portable telephone 40 may be blacked out instead of being displayed. In that case, the entire image is displayed if the user finds all the correct pairs.

Another possible game will be as follows. The image 20 specified by the user is displayed on the display device 468 as it is shone by a spotlight which the user can move freely by operating the input device 474 or a spotlight which moves automatically. In so doing, that part of the image 20 which is not shone by the spotlight is displayed in black or dark gray while the part shone by the spotlight is displayed in the normal display color of the image 20.

Still another possible game is such that the user adds graffiti to an image specified by him/her, by operating the input device 474. Besides, the present invention is not limited to game providing servers and game providing systems, but it is applicable to any system or server which can provide an amusement on a portable terminal based on images transmitted by a user.

As described above, since a game providing server and game providing system according to the present invention comprises a recording device which records game programs and information about types of the game programs by associating them with each other; a first transmitting device which reads the information about the types of game program out of the above-described recording device and transmits it to the user's communications terminal; a first receiving device which receives information specifying a type of game program to be run on the user's portable terminal and an image to be used for the game from the user's communications terminal; an image processing device which converts the above-described received image to be used for the game into a display image compatible with display capacity or display specifications of a display device installed on the user's portable terminal as required; and a second transmitting device which reads the specified game program from the above-described recording device and transmits it to the user's portable terminal together with the above-described display image, they allow the user to enjoy a game using a desired image on the user's portable terminal.

In the case of conventional game programs for portable terminals, since imaging resources for the games are contained in the game programs themselves and cannot be replaced by game images transmitted from users, the games are run only within the context of image contents prepared by game program developers. However, the game providing server and game providing system according to the present invention allow the user to transmit a desired image to the game providing server and run a game using that image on a portable terminal.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A game providing server which receives an image used for a game run on a portable terminal of a user from a communications terminal of the user and sends the image and a game program that uses the image to the portable terminal, the game providing server comprising:

a recording device which records game programs run on the user's portable terminal and information about types of the game programs by associating them with each other;

a first transmitting device which reads the information about the types of game program run on the user's portable terminal out of the recording device and transmits the read information to the user's communications terminal;

a receiving device which receives information specifying a type of game program to be run on the user's portable terminal and an image to be used for the game from the user's communications terminal;

an image processing device which converts the received image to be used for the game into a display image compatible with display capacity or display specifications of a display device installed on the user's portable terminal; and a second transmitting device which reads the specified game program from the recording device and transmits the read game program to the user's portable terminal together with the display image.

2. A game providing system which sends an image used for a game run on a portable terminal of a user from a communications terminal of the user to a game providing server, receives the image used for the game run on the user's portable terminal from a game providing server together with an appropriate game program, and runs the game program on the user's portable terminal and displays game content using the image, the game providing system comprising:

a game providing server which comprises:

a first recording device which records game programs run on the user's portable terminal and information about types of the game programs by associating them with each other;

a first transmitting device which reads the information about the types of game program run on the user's portable terminal out of the first recording device and transmits the read information to the user's communications terminal;

a first receiving device which receives information specifying a type of game program to be run on the user's portable terminal and an image to be used for the game from the user's communications terminal; and a second transmitting device which reads the specified game program from the first recording device and transmits the read game program to the user's portable terminal together with the received image to be used for the game;

a user's communications terminal which comprises:

a second recording device which records images used for games;

a second receiving device which receives information about the types of game program run on the user's portable terminal from the game providing server;

a first display device which displays the received information about the types of game program as well as images used for games read out of the second recording device;

an input device for the user to specify a desired game program and an image to be used for the game from among those displayed on the display device; and a third transmitting device which transmits information about the type of game program with the image to be used for the game to the game providing server as specified by the user; and a user's portable terminal which comprises:

a third receiving device which receives the specified type of game program and the image to be used for the game from the game providing server;

an information processing device which runs the game program using the received image; and a second display device which displays game content using the received image.

3. A game providing server comprising:

a recording device for recording game programs which are run on a remote terminal and type information about the game programs, and associating the game programs with the type information;

a first transmitting device for receiving the type information and game programs output by the recording device and transmitting the type information and game programs to a communications terminal;

a receiving device for receiving image data for an image to be used for the game programs from the communications terminal;

an image processing device which converts the received image data into converted image data to be used for the game programs and compatible with the remote terminal; and a second transmitting device which reads a specified game program from game programs recorded in the recording device and transmits the specified game program to the remote terminal together with information for the converted image data.

4. A game providing system comprising:

a game providing server which comprises:

a first recording device for recording game programs run on a remote terminal and type information the game programs, and associating the type information with the game programs;

a first transmitting device for reading the type information output by the first recording device and transmitting the type information to a communications terminal;

a first receiving device for receiving image data to be used for the game programs from the communications terminal; and a second transmitting device which reads a specified game program from the first recording device and transmits the specified game program to the remote terminal together with the received image to be used for the game;

a communications terminal which comprises:

a second recording device for recording images;

a second receiving device for receiving type information associated with the game programs from the game providing server;

a first display device for displaying the type information and image output from the second recording device;

an input device for the user to specify a desired game program and an image to be used for the game from among the type information displayed on the first display device; and a third transmitting device which transmits information about the specified game program with the image to be used for the game to the game providing server; and a remote terminal which comprises:

a third receiving device which receives the specified game program and information for the image to be used for the game from the game providing server;

an information processing device which runs the game program using the received image; and a second display device which displays game content using the received image.

5. The server of claim 3, wherein the information for the converted image data comprises a communications address for downloading the converted image data to the remote terminal.

6. The server of claim 3, wherein the image data received by the receiving device is output from an image capture device.

7. The server of claim 6, wherein the image capture device is a digital camera.

8. The server of claim 7, wherein the information for the converted image data comprises a communications address for downloading the converted image data to the remote terminal.

9. The game providing server of claim 3, wherein the remote terminal comprises a wireless communication device.

10. The game providing system of claim 4, wherein the remote terminal comprises a wireless communication device.

* * * * *